United States Patent
Piehler et al.

(10) Patent No.: US 11,835,781 B2
(45) Date of Patent: Dec. 5, 2023

(54) TWO-BY-TWO CABLE ASSEMBLY

(71) Applicant: Dell Products L.P., Round Rock, TX (US)

(72) Inventors: David Piehler, Mountain View, CA (US); Per Fremrot, Novato, CA (US)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 17/236,124

(22) Filed: Apr. 21, 2021

(65) Prior Publication Data

US 2022/0342171 A1    Oct. 27, 2022

(51) Int. Cl.
| | |
|---|---|
| G02B 6/36 | (2006.01) |
| G02B 6/12 | (2006.01) |
| G02B 6/26 | (2006.01) |
| G02B 6/42 | (2006.01) |
| G02B 6/30 | (2006.01) |
| G02B 6/44 | (2006.01) |
| H01B 11/00 | (2006.01) |

(52) U.S. Cl.
CPC ......... *G02B 6/4471* (2013.01); *H01B 11/002* (2013.01)

(58) Field of Classification Search
CPC .. G02B 6/4471; G02B 6/4284; H01B 11/002; H04B 10/25
USPC .......................... 385/3, 14, 20, 22, 39, 49, 89
See application file for complete search history.

(56) References Cited

U.S. PATENT DOCUMENTS

| | | | | |
|---|---|---|---|---|
| 7,483,600 B2* | 1/2009 | Achiam | ............... | G02B 6/4225 |
| | | | | 385/14 |
| 2002/0159684 A1* | 10/2002 | Sun | ......... | G02F 1/225 |
| | | | | 385/20 |
| 2022/0308301 A1* | 9/2022 | Xu | ....... | G02B 6/4452 |

* cited by examiner

*Primary Examiner* — Kaveh C Kianni
*Assistant Examiner* — Hung Q Lam
(74) *Attorney, Agent, or Firm* — Jackson Walker L.L.P

(57) ABSTRACT

A cable assembly may include a first end and a second end. The first end may include a first breakout including a plurality of transmissive conduits implementing a plurality of communications channels and a second breakout including a plurality of conduits implementing a plurality of communications channels. The second end may include a third breakout including a plurality of conduits implementing a plurality of communications channels and a fourth breakout including a plurality of conduits implementing a plurality of communications channels. Communication channels of the first breakout, second breakout, third breakout, and fourth breakout may be arranged such that the first breakout shares a first communications channel with the third breakout, the first breakout shares a second communications channel with the fourth breakout, the second breakout shares a third communications channel with the third breakout, and the second breakout shares a fourth communications channel with the fourth breakout.

10 Claims, 3 Drawing Sheets

US 11,835,781 B2

TWO-BY-TWO CABLE ASSEMBLY

TECHNICAL FIELD

The present disclosure relates in general to information handling systems, and more particularly to systems and methods for providing a two-by-two cable assembly for use in networked communication.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Coupling a single interface on a network interface card to two distinct (and redundant) switches (e.g., Ethernet "top-of-rack" switches) may result in wasted switch bandwidth when the network interface card and the switch utilize the same speed pluggable interface. For example, in existing approaches, one may couple a cable to a network interface card at one end. Such cable may have breakouts at its other end for coupling to two switches with the same port speed as the network interface card, in which case, each switch would then only use half of its available bandwidth.

SUMMARY

In accordance with the teachings of the present disclosure, the disadvantages and problems associated with existing cable assemblies may be reduced or eliminated.

In accordance with embodiments of the present disclosure, a cable assembly may include a first end and a second end. The first end may include a first breakout including a plurality of transmissive conduits implementing a plurality of communications channels and a second breakout including a plurality of conduits implementing a plurality of communications channels. The second end may include a third breakout including a plurality of conduits implementing a plurality of communications channels and a fourth breakout including a plurality of conduits implementing a plurality of communications channels. Communication channels of the first breakout, second breakout, third breakout, and fourth breakout may be arranged such that the first breakout shares a first communications channel with the third breakout, the first breakout shares a second communications channel with the fourth breakout, the second breakout shares a third communications channel with the third breakout, and the second breakout shares a fourth communications channel with the fourth breakout.

In accordance with these and other embodiments of the present disclosure, a method for forming a cable assembly may include forming a first end of the cable assembly to include a first breakout including a plurality of transmissive conduits implementing a plurality of communications channels and a second breakout including a plurality of conduits implementing a plurality of communications channels. The method may also include forming a second end of the cable assembly to include a third breakout including a plurality of conduits implementing a plurality of communications channels and a fourth breakout including a plurality of conduits implementing a plurality of communications channels. The method may further include arranging communication channels of the first breakout, second breakout, third breakout, and fourth breakout such that the first breakout shares a first communications channel with the third breakout, the first breakout shares a second communications channel with the fourth breakout, the second breakout shares a third communications channel with the third breakout, and the second breakout shares a fourth communications channel with the fourth breakout.

In accordance with these and other embodiments of the present disclosure, a method may be provided for using a cable assembly comprising a first end of the cable assembly having a first breakout including a plurality of transmissive conduits implementing a plurality of communications channels, a second breakout including a plurality of conduits implementing a plurality of communications channels and a second end of the cable assembly having a third breakout including a plurality of conduits implementing a plurality of communications channels and a fourth breakout including a plurality of conduits implementing a plurality of communications channels, and the cable assembly arranged such that the first breakout shares a first communications channel with the third breakout, the first breakout shares a second communications channel with the fourth breakout, the second breakout shares a third communications channel with the third breakout, and the second breakout shares a fourth communications channel with the fourth breakout. The method may include coupling the first breakout to a first communications port of a first information handling system, coupling the second breakout to a second communications port of a second information handling system, coupling the third breakout to a third communications port of a third information handling system, and coupling the fourth breakout to a fourth communications port of a fourth information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
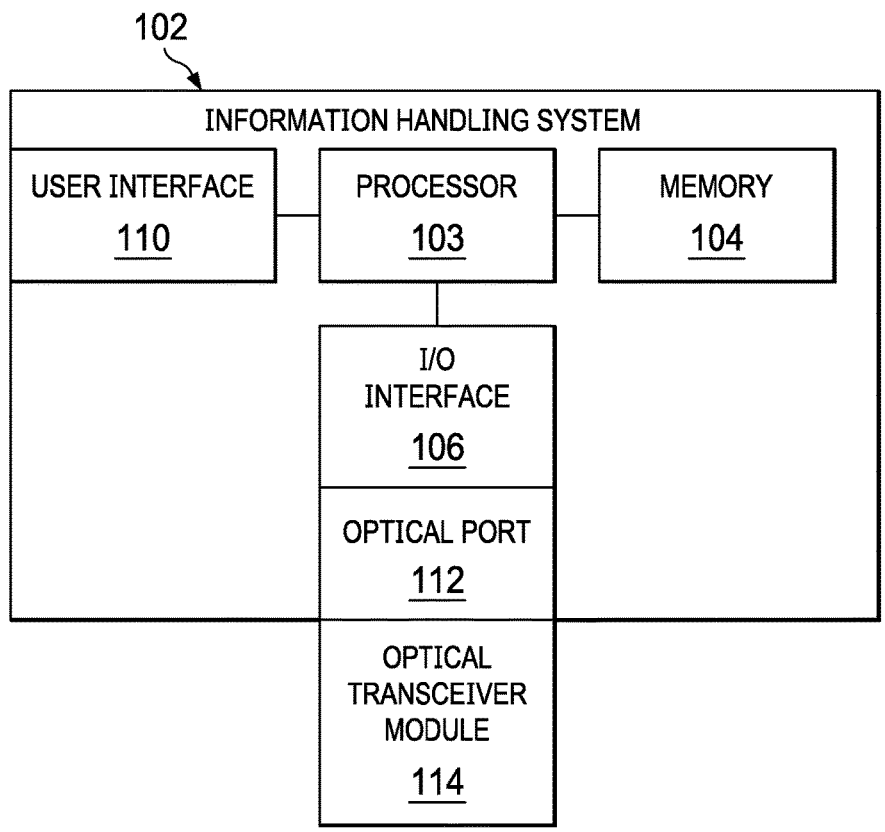
FIG. 1 illustrates a block diagram of selected components of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and a network port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC." In some embodiments, I/O interface may comprise multiple electrical connections that may be divided into multiple physical ports.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Network port 112 may comprise an electrical connector in the form of any suitable combination of a jack, a socket, and/or "cage" for receiving a corresponding connector of an optical transceiver module 114.

Optical transceiver module 114 may include any system, device, or apparatus that houses and includes an optical transceiver configured to convert an incoming optical signal into an equivalent electrical signal, and communicate such equivalent electrical signal to I/O interface 106, and also configured to receive an electrical signal from I/O interface 106, convert such electrical signal into an equivalent optical signal, and communicate such optical signal as an outgoing optical signal (e.g., via an optical cable, which may be integral to the same assembly as optical transceiver module 114). Optical transceiver module 114 may include a small form-factor pluggable (SFP) transceiver or a quad small form-factor pluggable (QSFP) transceiver, or any other suitable form factor.

In addition to processor 103, memory 104, I/O interface 106, user interface 110, network port 112, and optical transceiver module 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electromechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
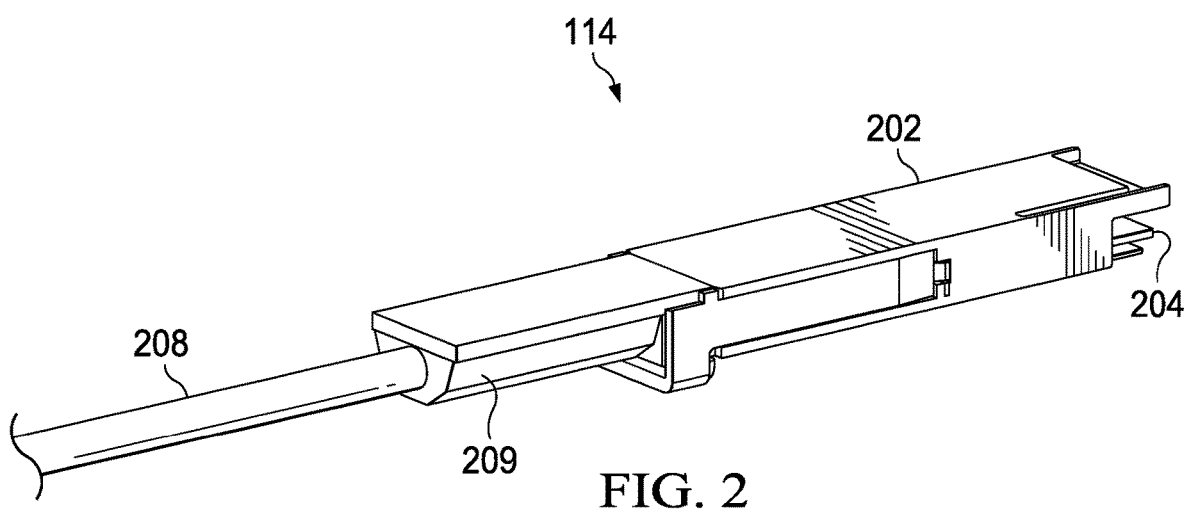
FIG. 2 illustrates a perspective view of an example optical transceiver module, in accordance with embodiments of the present disclosure.

FIG. 2 illustrates a perspective view of an example optical transceiver module 114 and cable 208 inserted into optical transceiver module 114, in accordance with embodiments of the present disclosure. In some embodiments, example optical transceiver module 114 depicted in FIG. 2 may be used to implement optical transceiver module 114 of FIG. 1. As shown in FIG. 2, optical transceiver module 114 may include a housing 202 for housing an optical transceiver 204 and one or more other components, a cable 208, and a strain relief feature 209. Housing 202 may comprise a metal enclosure configured to house and/or provide mechanical structure for optical transceiver 204, including mechanical features (e.g., guiding features) for aligning and/or mechanically securing optical transceiver 204 to I/O interface 106 via network port 112.

Optical transceiver 204 may include any system, device, or apparatus configured to receive an incoming optical signal (e.g., via cable 208), convert the incoming optical signal into an equivalent electrical signal, and communicate such equivalent electrical signal to I/O interface 106 (e.g., via network port 112), and also configured to receive an electrical signal from I/O interface 106 (e.g., via network port 112), convert such electrical signal into an equivalent optical signal, and communicate such optical signal as an outgoing optical signal (e.g., via cable 208).

Cable 208 may include any suitable system, device, or apparatus capable of passing optical signals therethrough. For example, cable 208 may include one or more optical fibers surrounded by optically opaque material and/or material for protecting such one or more optical fibers. Such one or more optical fibers integral to cable 208 may be optically coupled to optical transceiver 204, thus enabling communication with optical transceiver 204 via such optical fibers.

Strain relief feature 209 may mechanically enclose cable 208 and may be formed from any suitable material that may be configured to provide strain relief to cable 208 while also providing support to the extension of housing 202.

Figure 3:
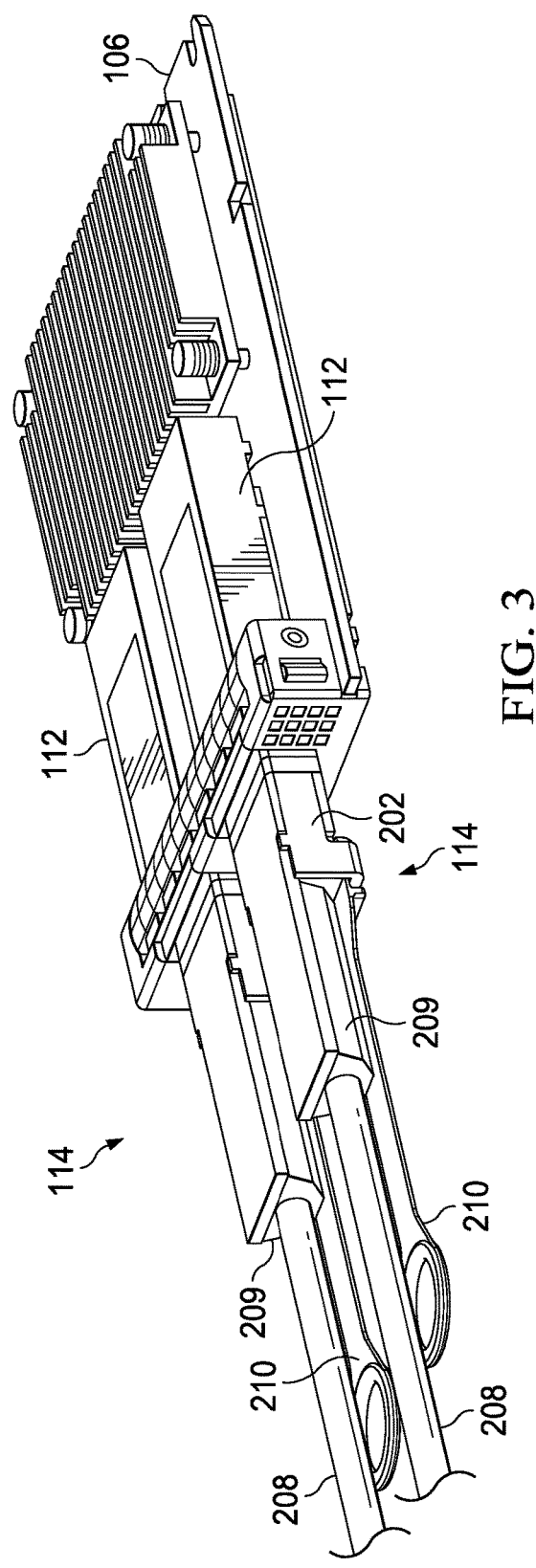
FIG. 3 illustrates a perspective view of two instances of the example optical transceiver module shown in FIG. 2 inserted into respective optical ports of an I/O interface, in accordance with embodiments of the present disclosure.

FIG. 3 illustrates a perspective view of two instances of example optical transceiver module 114 shown in FIG. 2 inserted into respective network ports 112 of I/O interface 106, in accordance with embodiments of the present disclosure. FIG. 3 illustrates pull tabs 210 that may be integral to each cable 208 and may assist a user in removing an optical transceiver module 114 from a network port 112.

Figure 4:
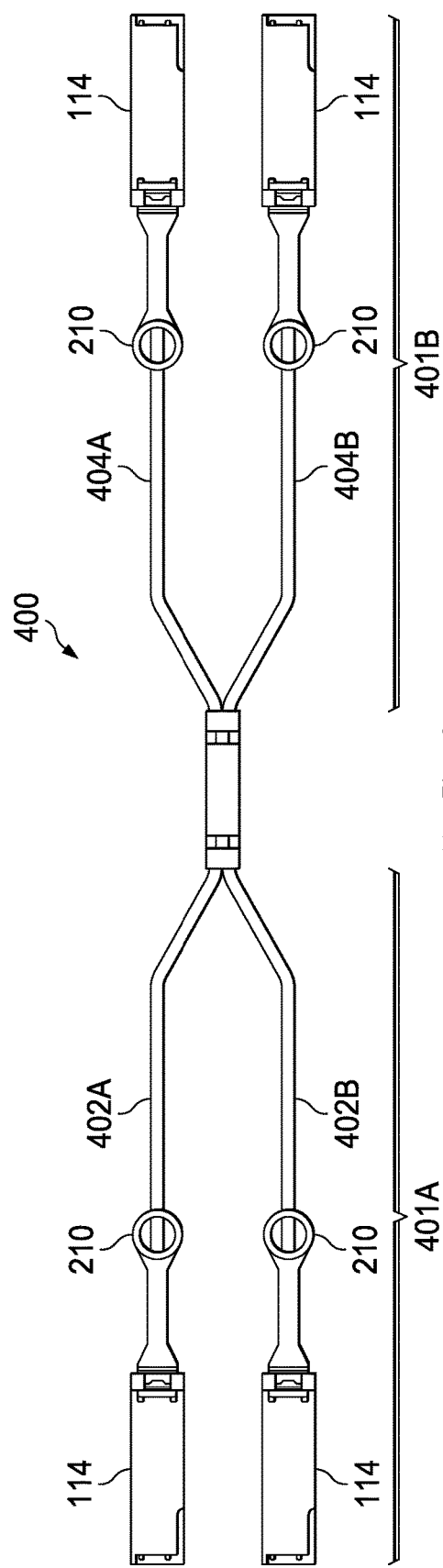
FIG. 4 illustrates a plan view of an example two-by-two cable assembly, in accordance with the present disclosure.

FIG. 4 illustrates a plan view of an example two-by-two cable assembly 400, in accordance with the present disclosure. A two-by-two cable assembly 400 as shown in FIG. 4 may be used in lieu of a cable 208 and optical transceiver module 114 depicted in FIGS. 1 through 3. As shown in FIG. 4, two-by-two cable assembly 400 may include a first end 401A and a second end 401B. The terms "first end" and "second end" are used herein only for the purposes of clarity of exposition, and are not intended to indicate any polarity or directionality, and first end 401A may be substantially identical to second end 401B. In fact, two-by-two cable assembly 400 may enable bidirectional communication.

As also shown in FIG. 4, first end 401A may be split into two breakouts 402A and 402B, each breakout 402 comprising optical fibers implementing at least two communications channels, and each breakout 402 terminated with a corresponding optical transceiver module 114. Similarly, second end 401B may be split into two breakouts 404A and 404B, each breakout 404 comprising optical fibers implementing at least two communications channels, and each breakout 404 terminated with a corresponding optical transceiver module 114. Further, two-by-two cable assembly 400 may be implemented such that one communications channel of breakout 402A is present in breakout 404A and one communications channel of breakout 402A is present in breakout 404B, and such that one communications channel of breakout 402B is present in breakout 404A and one communications channel of breakout 402B is present in breakout 404B. In other words, a device communicatively coupled to optical transceiver module 114 terminating breakout 402A may communicate via one channel with a device communicatively coupled to optical transceiver module 114 terminating breakout 404A and communicate via another channel with a device communicatively coupled to optical transceiver module 114 terminating breakout 404B. Similarly, a device communicatively coupled to optical transceiver module 114 terminating breakout 402B may communicate via one channel with a device communicatively coupled to optical transceiver module 114 terminating breakout 404A and communicate via another channel with a device communicatively coupled to optical transceiver module 114 terminating breakout 404B.

Figure 5:
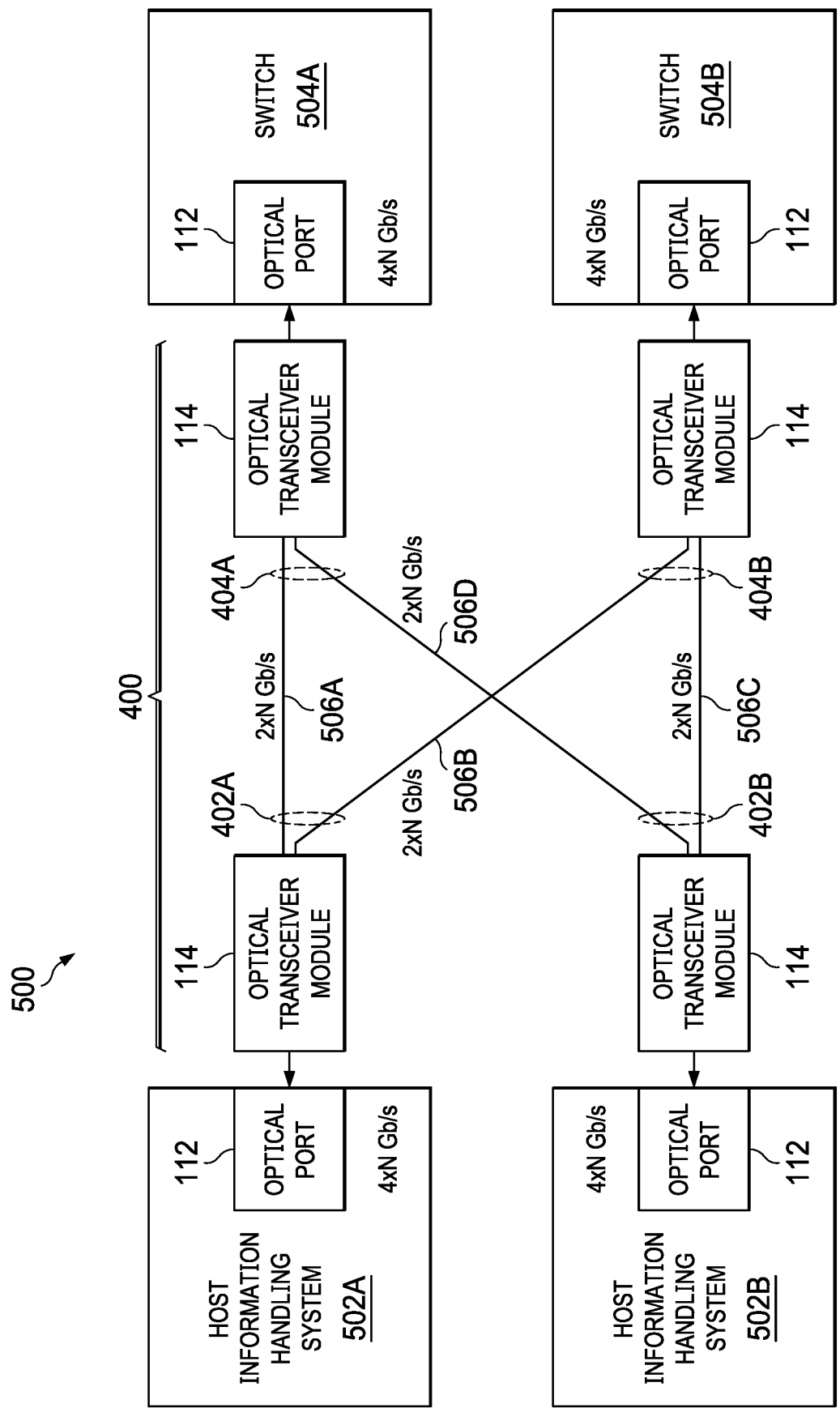
FIG. 5 illustrates a block and cable diagram of an example networked system comprising a two-by-two cable assembly, in accordance with the present disclosure.

FIG. 5 illustrates a block and cable diagram of an example networked system 500 comprising a two-by-two cable assembly 400, in accordance with the present disclosure. As shown in FIG. 5, an optical transceiver module 114 terminating breakout 402A may be coupled to a network port 112 of a host information handling system 502A and an optical transceiver module 114 terminating breakout 402B may be coupled to a network port 112 of a host information handling system 502B. Each host information handling system 502 may comprise an information handling system 102 as described above, and may have a communications bandwidth of 2×N gigbits per second, wherein N is any positive number (e.g., 25). Also as shown in FIG. 5, an optical transceiver module 114 terminating breakout 404A may be coupled to a network port 112 of a switch 504A and an optical transceiver module 114 terminating breakout 404B may be coupled to a network port 112 of a switch 504B. Each switch 504 may comprise an information handling system 102 as described above, and may have a communications bandwidth of 4×N gigbits per second.

As further shown in FIG. 5, breakout 402A may share a communications channel 506A with breakout 404A, breakout 402A may share a communications channel 506B with breakout 404B, breakout 402B may share a communications channel 506C with breakout 404B, and breakout 402B may share a communications channel 506D with breakout 404A. In addition, each communications channel 506 may have a communication bandwidth of 2×N gigbits per second. Accordingly, the four communications channels 506 shown in FIG. 5 are coupled to host information handling systems 502 and switches 504 in a manner that may insure that the bandwidth of each switch 504 is fully utilized, while providing a redundant switch 504 to each host information handling system 502.

Although the foregoing contemplates two-by-two cable assembly implementing optical fibers terminated into optical transceiver modules, in other embodiments, two-by-two cable assembly may be implemented in other transmission media besides optical fibers (e.g., metal wires) and may be terminated in terminations other than optical transceiver modules (e.g., connectors for electrical cables, such as, for example, an RJ-45 connector).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A cable assembly, comprising:
 a first end comprising:
   a first breakout including a plurality of transmissive conduits implementing a plurality of communications channels; and
   a second breakout including a plurality of conduits implementing a plurality of communications channels; and
 a second end comprising:
   a third breakout including a plurality of conduits implementing a plurality of communications channels; and
   a fourth breakout including a plurality of conduits implementing a plurality of communications channels;
 wherein communication channels of the first breakout, second breakout, third breakout, and fourth breakout are arranged such that:
   the first breakout shares a first communications channel with the third breakout;
   the first breakout shares a second communications channel with the fourth breakout;
   the second breakout shares a third communications channel with the third breakout; and
   the second breakout shares a fourth communications channel with the fourth breakout;
 wherein the first breakout is terminated with a first termination, the second breakout is terminated with a second termination, the third breakout is terminated with a third termination, and the fourth breakout is terminated with a fourth termination;

wherein the first termination, the second termination, the third termination, and the fourth termination each comprise an optical transceiver module configured to couple to an optical port; and wherein each communications channel has a first communication bandwidth and wherein a communication bandwidth of each optical port is double the first communication bandwidth.

2. The cable assembly of claim 1, wherein:

the first termination is coupled to a first optical port of a first host information handling system;

the second termination is coupled to a second optical port of a second host information system;

the third termination is coupled to a third optical port of a first network switch;

the fourth termination is coupled to a fourth optical port of a second network switch.

3. The cable assembly of claim 1, wherein each breakout includes a pull tab coupled to the corresponding termination to facilitate remove the termination from the port.

4. The cable assembly of claim 1, wherein each optical transceiver module comprises a small form-factor pluggable (SFP) transceiver.

5. The cable assembly of claim 1, wherein each of the optical transceiver modules comprises a quad small form-factor pluggable (QSFP) transceiver.

6. A method for forming a cable assembly, comprising:

forming a first end of the cable assembly to include:
a first breakout including a plurality of transmissive conduits implementing a plurality of communications channels; and
a second breakout including a plurality of conduits implementing a plurality of communications channels;

forming a second end of the cable assembly to include:
a third breakout including a plurality of conduits implementing a plurality of communications channels; and
a fourth breakout including a plurality of conduits implementing a plurality of communications channels; and arranging communication channels of the first breakout, second breakout, third breakout, and fourth breakout such that:

the first breakout shares a first communications channel with the third breakout;

the first breakout shares a second communications channel with the fourth breakout;

the second breakout shares a third communications channel with the third breakout; and the second breakout shares a fourth communications channel with the fourth breakout;

wherein the first breakout is terminated with a first termination, the second breakout is terminated with a second termination, the third breakout is terminated with a third termination, and the fourth breakout is terminated with a fourth termination;

wherein the first termination, the second termination, the third termination, and the fourth termination each comprise an optical transceiver module configured to couple to an optical port; and wherein each communications channel has a first communication bandwidth and wherein a communication bandwidth of each optical port is double the first communication bandwidth.

7. The method of claim 6, further comprising:

the first termination is coupled to a first optical port of a first host information handling system;

the second termination is coupled to a second optical port of a second host information system;

the third termination is coupled to a third optical port of a first network switch;

the fourth termination is coupled to a fourth optical port of a second network switch.

8. The method of claim 6, wherein each breakout includes a pull tab coupled to the corresponding termination to facilitate remove the termination from the port.

9. The method of claim 6, wherein each optical transceiver module comprises a small form-factor pluggable (SFP) transceiver.

10. The method of claim 6, wherein each of the optical transceiver modules comprises a quad small form-factor pluggable (QSFP) transceiver.

* * * * *